(12) United States Patent
Smith, III et al.

(10) Patent No.: US 10,865,892 B2
(45) Date of Patent: Dec. 15, 2020

(54) SUBSEA VALVE WITH NON-CIRCULAR SLIDING METAL SEALS

(71) Applicant: National Coupling Company, Inc., Stafford, TX (US)

(72) Inventors: Robert E. Smith, III, Missouri City, TX (US); Thomas Rogala, Stafford, TX (US)

(73) Assignee: National Coupling Company, Stafford, TX (US)

( * ) Notice: Subject to any disclaimer, the term of this patent is extended or adjusted under 35 U.S.C. 154(b) by 55 days.

(21) Appl. No.: 15/840,861

(22) Filed: Dec. 13, 2017

(65) Prior Publication Data
US 2018/0163879 A1 Jun. 14, 2018

Related U.S. Application Data

(60) Provisional application No. 62/433,892, filed on Dec. 14, 2016.

(51) Int. Cl.
*F16K 11/074* (2006.01)
*F16K 3/02* (2006.01)

(52) U.S. Cl.
CPC ........ *F16K 11/0743* (2013.01); *F16K 3/0209* (2013.01); *F16K 3/0227* (2013.01); *F16K 11/074* (2013.01); *Y10T 137/86638* (2015.04)

(58) Field of Classification Search
CPC .. F16K 11/0743; F16K 3/0209; F16K 3/0227; F16K 11/074; Y10T 137/86638
See application file for complete search history.

(56) References Cited

U.S. PATENT DOCUMENTS

| 2,519,574 | A | | 8/1950 | Holl | |
|---|---|---|---|---|---|
| 2,832,561 | A | | 4/1958 | Holl | |
| 3,776,276 | A | | 12/1973 | Stiltner | |
| 3,796,232 | A | * | 3/1974 | Dalton | F15B 13/04 137/625.21 |
| 4,142,868 | A | * | 3/1979 | Gencsoy | C10J 3/30 277/387 |
| 4,376,459 | A | * | 3/1983 | Nagashima | F16K 3/08 137/625.31 |

(Continued)

FOREIGN PATENT DOCUMENTS

DE 8133306 U1 11/1981
DE 69401937 T2 3/1997
(Continued)

OTHER PUBLICATIONS

Search Report issued in counterpart Great Britain Application No. GB1720820.8, dated Jun. 7, 2018.

*Primary Examiner* — Kevin R Barss
(74) *Attorney, Agent, or Firm* — Blank Rome LLP

(57) ABSTRACT

A sliding metal seal valve comprises one or more non-circular (oblate) metal seals. Use of non-circular (oblate) sliding metal seals, permits the rotor of a rotary sliding metal seal valve to have a smaller diameter which permits a smaller overall valve size. Reduced rotor diameter also reduces the torque required to turn the rotor, permitting smaller actuator motors to be used. Axially sliding valves such as bar valves may also employ such non-circular sliding metal seals to permit a reduction in the width of such valve.

21 Claims, 4 Drawing Sheets

(56) References Cited

U.S. PATENT DOCUMENTS

| | | | | |
|---|---|---|---|---|
| 4,452,462 A | * | 6/1984 | Karr, Jr. | F16J 15/0887 |
| | | | | 285/112 |
| 5,901,748 A | | 5/1999 | Jessop | |
| 5,934,320 A | * | 8/1999 | O'Reilly | F16K 3/04 |
| | | | | 137/270 |
| 6,416,032 B2 | * | 7/2002 | Oh | B60H 1/00485 |
| | | | | 251/14 |
| 6,725,881 B1 | * | 4/2004 | Beswick | A61C 1/0061 |
| | | | | 137/625.11 |
| 7,143,786 B2 | * | 12/2006 | Romero | F16K 3/08 |
| | | | | 137/606 |
| 8,281,814 B2 | * | 10/2012 | Kim | F16K 11/0743 |
| | | | | 137/454.6 |
| 8,668,204 B2 | | 3/2014 | Reeb et al. | |
| 9,970,555 B2 | | 5/2018 | Jurczyk | |
| 2016/0130905 A1 | * | 5/2016 | Holmes | G05B 15/02 |
| | | | | 700/282 |

FOREIGN PATENT DOCUMENTS

| | | |
|---|---|---|
| DE | 102009028652 A1 | 2/2011 |
| EP | 0052743 A1 | 6/1982 |
| GB | 2340917 A | 3/2000 |
| GB | 2527339 A | 12/2015 |
| WO | 2015004438 A1 | 1/2015 |

* cited by examiner

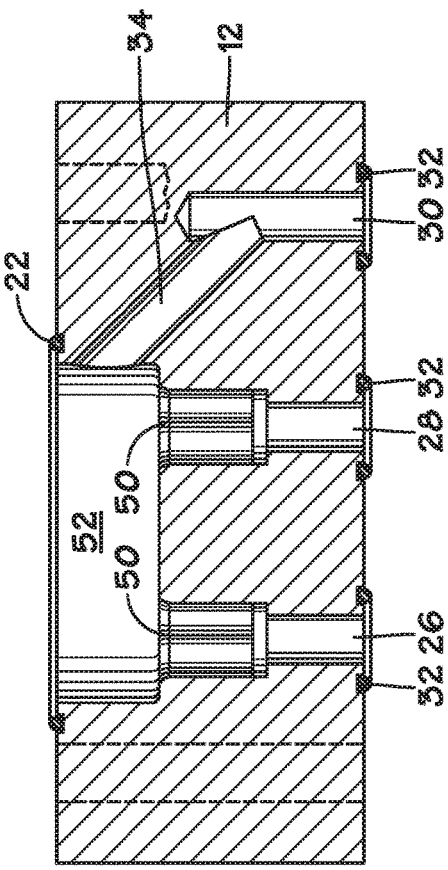
FIG. 2
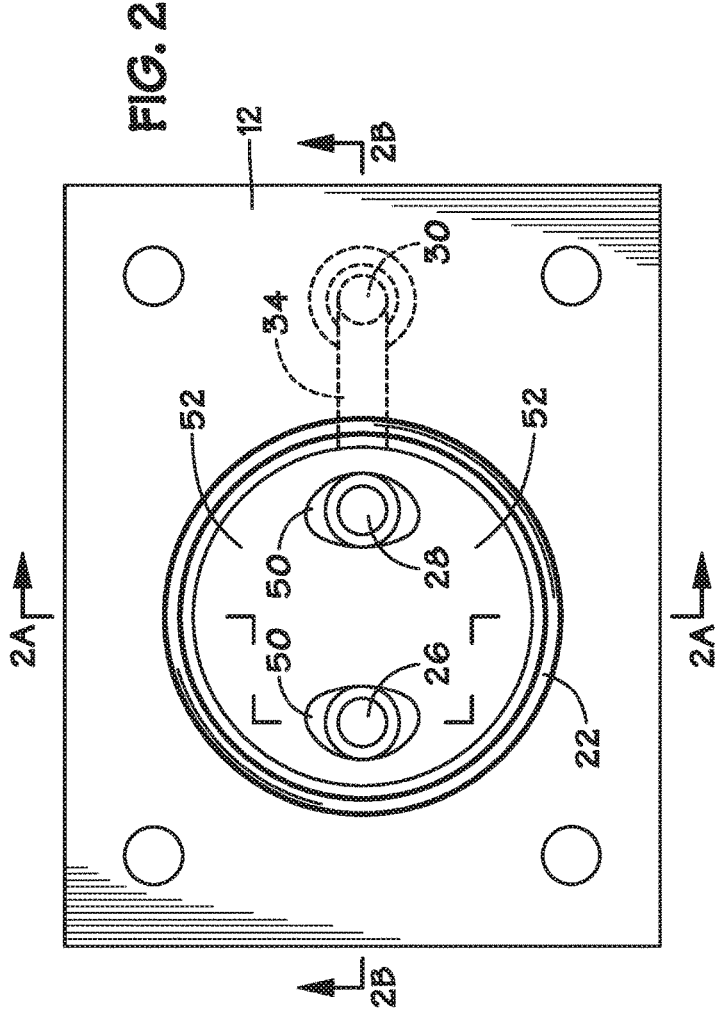
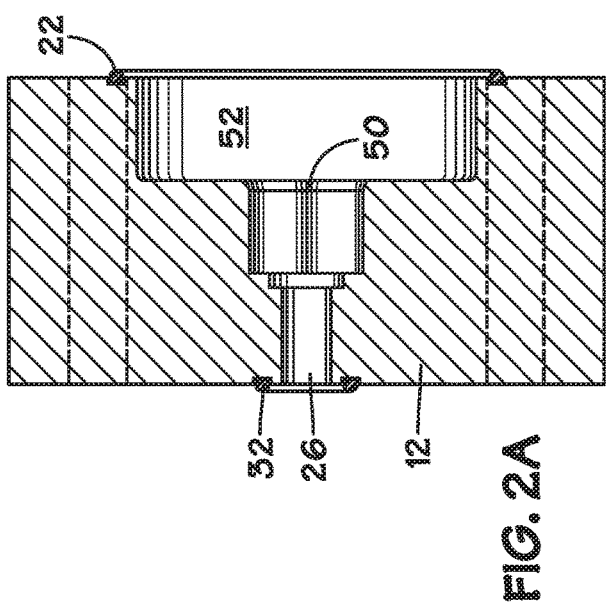
FIG. 2A
FIG. 2B

SUBSEA VALVE WITH NON-CIRCULAR SLIDING METAL SEALS

CROSS-REFERENCE TO RELATED APPLICATIONS

This application claims the benefit of U.S. Provisional Application No. 62/433,892 filed on Dec. 14, 2016.

STATEMENT REGARDING FEDERALLY SPONSORED RESEARCH OR DEVELOPMENT

Not Applicable

BACKGROUND OF THE INVENTION

1. Field of the Invention

The present invention generally relates to sliding-seal valves. More particularly, it relates to subsea rotary valves having metal-to-metal sliding seals.

2. Description of the Related Art Including Information Disclosed Under 37 CFR 1.97 and 1.98

Sliding metal seal valves are commonly used in subsea oil and gas well-control applications. In such applications, a plurality of such valves are often mounted in a subsea control pod. Because such subsea control pods are of limited size, there is an ongoing need to reduce the overall size of the valves without compromising their flow characteristics in order to permit more valves to be housed within the control pod.

BRIEF SUMMARY OF THE INVENTION

It has been found that equipping a sliding metal seal valve with non-circular (oblate) metal seals permits the overall dimensions of the valve [OD if circular or other footprint] to be reduced without reducing the flow capacity of the valve.

BRIEF DESCRIPTION OF THE SEVERAL VIEWS OF THE DRAWING(S)

FIG. 2 is a top plan view of the base body of the valve assembly illustrated in FIG. 1A.

FIG. 2A is a cross-sectional view taken along line A-A in FIG. 2.

FIG. 2B is a cross-sectional view taken along line B-B in FIG. 2.

DETAILED DESCRIPTION OF THE INVENTION

Figure 1A:
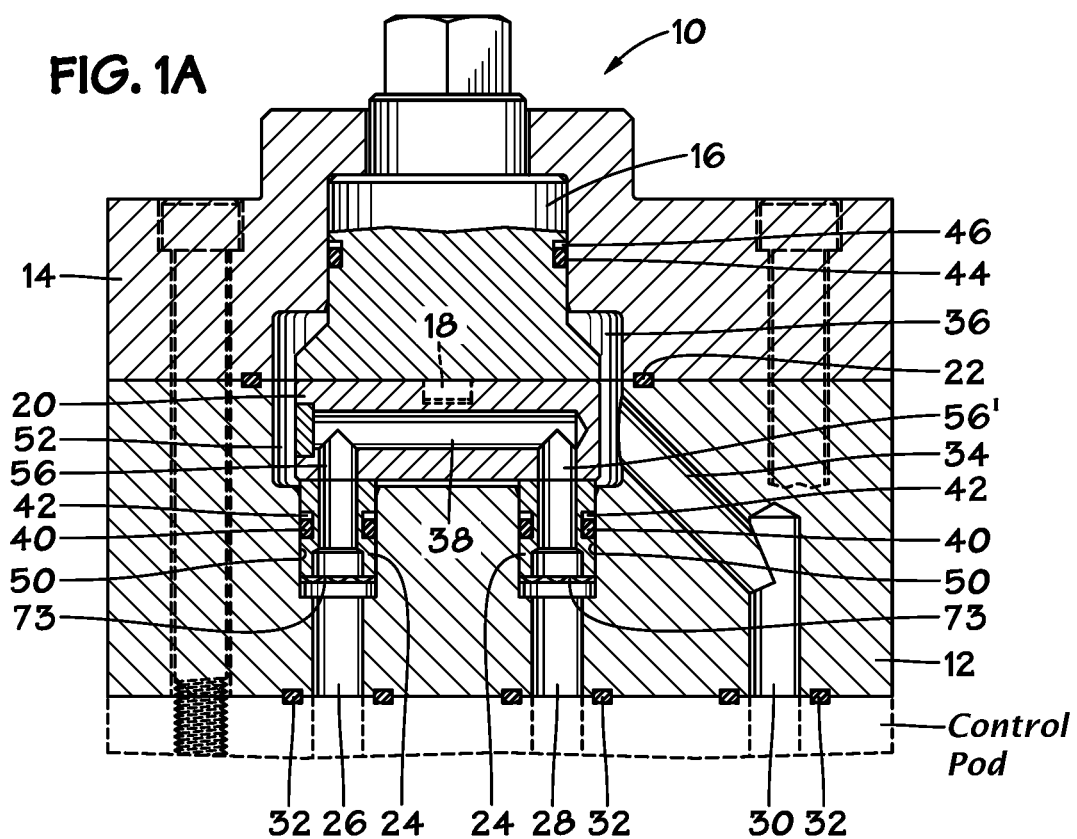
FIG. 1A is a cross-sectional view of a valve assembly according to one embodiment of the invention.

The invention may best be understood by reference to the exemplary embodiments illustrated in the drawing figures.

Figure 1B:
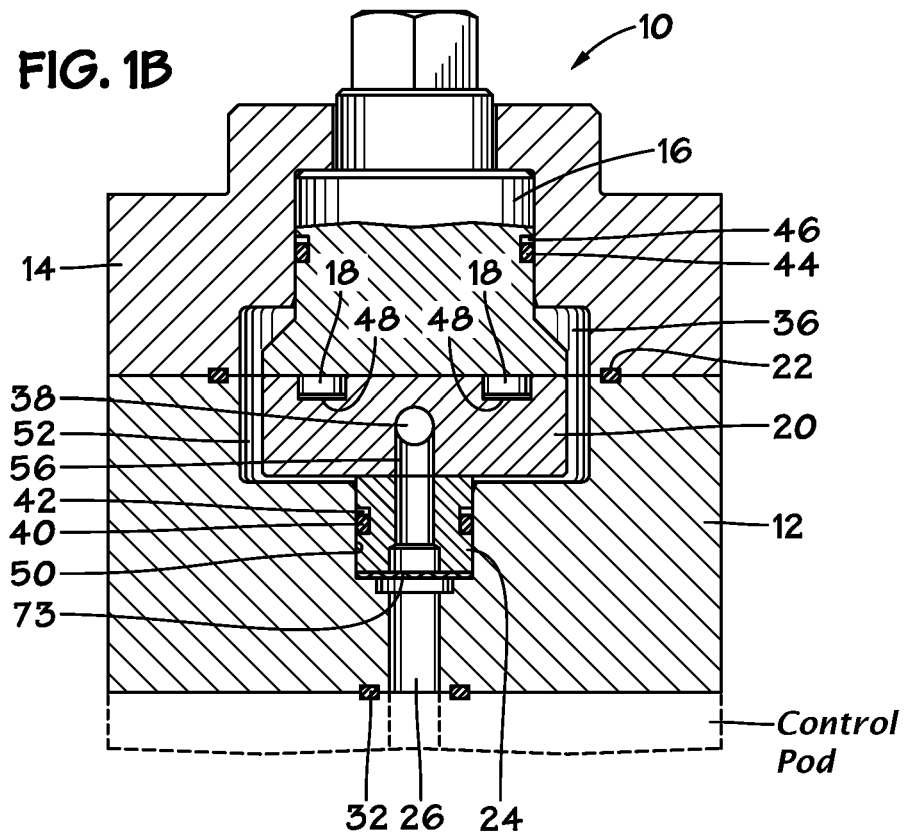
FIG. 1B is a cross-sectional view of the valve assembly illustrated in FIG. 1A at 90° to the section shown in FIG. 1A.

In the illustrated embodiments, the following numbers are used to refer to the listed elements:

10 valve assembly
12 base body
14 upper body
16 shaft
18 lugs
20 rotor
22 seal (base to upper body)
24 metal seal
26 supply port
28 function port
30 vent port
32 port seals
34 diagonal passageway
36 annular cavity
38 internal cross passageway
40 circumferential metal seal body seal
42 circumferential metal seal body seal back-up ring
44 shaft seal
46 shaft seal back-up ring
48 lug engagement blind holes
50 counterbore for sliding metal seal
52 rotor cavity
54 circular sliding metal seal (prior art)
56 seal-engaging passageway
57 radial passageway
58 reduced rotor diameter
59 vent connection
60 non-circular (oblate) sliding metal seal
62 through bore
64 peripheral seal groove
66 bar (of bar valve)
68 sliding metal bar seal
70 non-circular (oblate) sliding metal seal
72 reduced bar width
73 wave spring Referring first to FIGS. 1A and 1B—orthogonal cross-sectional views of a valve assembly according to an embodiment of the invention—valve assembly 10 comprises upper body 14 and base body 12 with seal 22 between them. In an embodiment, seal 22 is an O-ring seal. Other conventional face seals known in the art may be used. Rotor 20 is positioned in rotor cavity 52 and may be turned by shaft 16 which has projecting lugs 18 that engage lug engagement blind holes 48 in the upper surface of rotor 20. Shaft seal 44 and shaft seal backup ring 46 seal between shaft 16 and upper body 14. In an embodiment, shaft 16 is connected to a stepper motor drive assembly (not shown).

As noted in the Background of the present disclosure, a sliding metal seal valve is often mounted in a subsea control pod. As may best be seen in FIGS. 1A-1B, base body 12 is provided with supply port 26, function port 28 and vent port 30 each having an associated face seal 32 to seal against a pod base plate, manifold plate or other of such a subsea control pod. In an embodiment, face seals 32 are O-rings with an associated back-up ring.

Vent port 30 is in fluid communication with annular cavity 36 via diagonal passageway 34.

Rotor 20 has internal cross passage 38 which permits selective fluid communication between supply port 26 and function port 28 or between function port 28 and vent port 30 depending upon the rotational position of rotor 20. Rotor 20 may also be positioned such that all ports (26, 28, and 30) are closed. In FIG. 1B, rotor 20 is shown in a position that connects supply port 26 to function port 28. Rotor 20 may have an outside diameter (O.D.) that is smaller than the inside diameter (I.D.) of rotor cavity 52 thereby creating annular cavity 36.

Two non-circular (oblate) sliding metal seals 24 are shown installed in non-circular counterbores 50 in base body 12 intermediate circular rotor cavity 52 and ports 26 and 28. Circumferential metal seal body seals 40 and circumferential metal seal body seal back-up rings 42 are provided to seal between metal seals 24 and counterbores 50.

Figure 4:
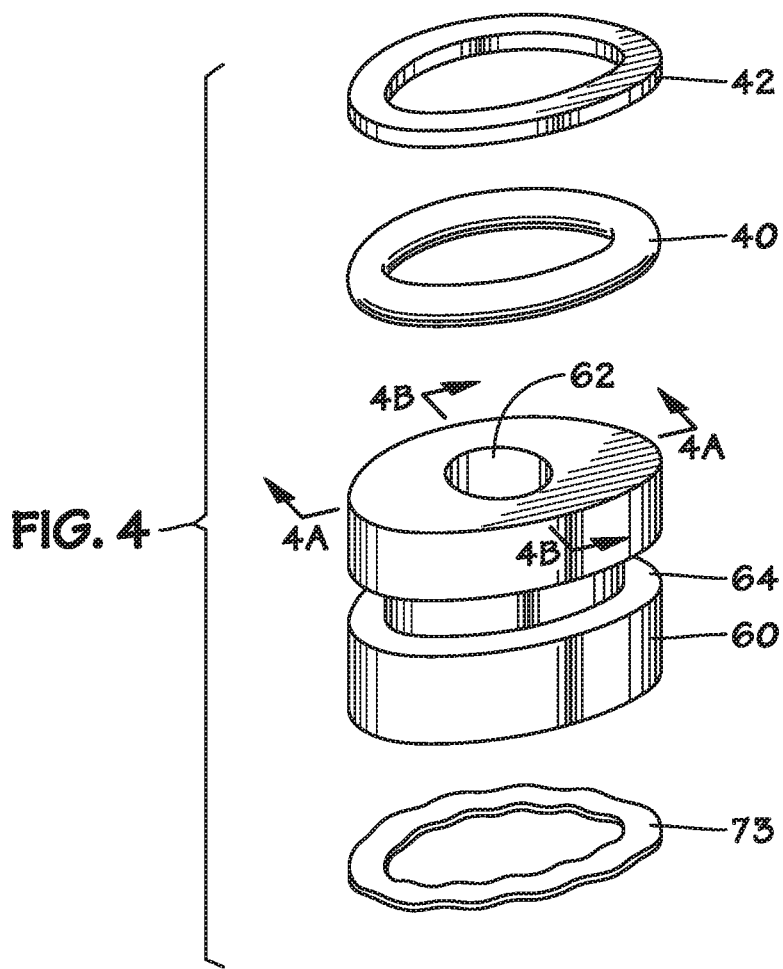
FIG. 4 is an exploded, three-dimensional view of the sliding metal seal of the valve illustrated in FIGS. 1A and 1B.
Figure 4A:
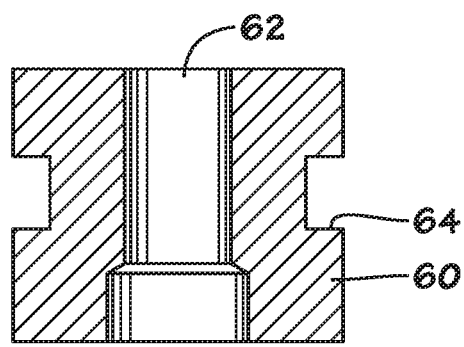
FIG. 4A is a cross-sectional view taken along line A-A in FIG. 4.
Figure 4B:
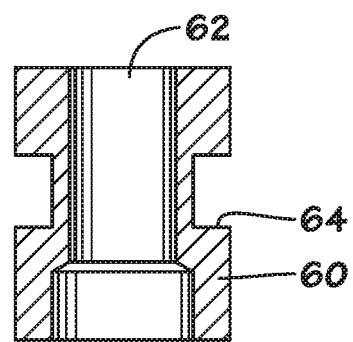
FIG. 4B is a cross-sectional view taken along line B-B in FIG. 4.

FIG. 2—a top plan view of the base body 12 of the valve illustrated in FIGS. 1A and 1B—shows rotor cavity 52 with oblate counterbores 50 for holding non-circular sliding metal seals 60 (see FIGS. 4, 4A, and 4B).

Figure 3A:
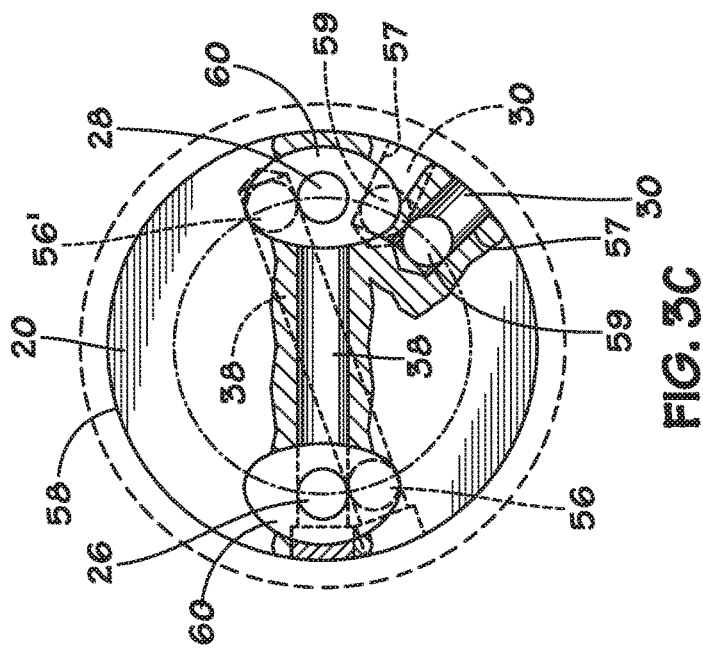
FIG. 3A is a bottom plan view, partially in cross-sectional phantom, of a rotor of a sliding metal seal valve of the prior art with the metal seals shown superimposed.
Figure 3B:
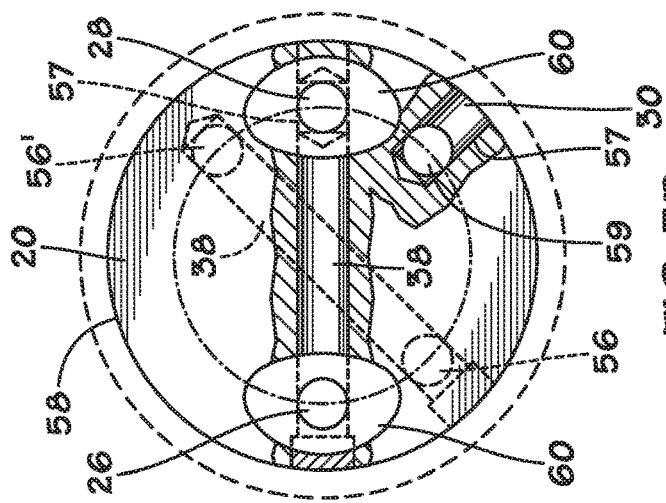
FIG. 3B is a bottom plan view, partially in cross-sectional phantom, of the rotor of the sliding metal seal valve illustrated in FIGS. 1A and 1B with the metal seals shown superimposed.

FIG. 3A is a bottom plan view, partially in cross-sectional phantom, of a rotor of a sliding metal seal valve of the prior art. FIG. 3B is a bottom plan view, partially in cross-sectional phantom, of the rotor of the sliding metal seal valve illustrated in FIGS. 1A and 1B. In FIG. 3A, conventional circular sliding metal seals 54 are shown in sealing engagement with rotor 20.

The bottom face of rotor 20 has three openings: metal seal-engaging passageways 56 and 56' (interconnected by internal cross passage 38) and vent connection 59 (which connects to radial passageway 57). In FIGS. 3A and 3B, function port 28 is shown connected to vent connection 59 and thence (via radial passageway 57) to vent port 30 (via annulus 36).

Figure 3C:
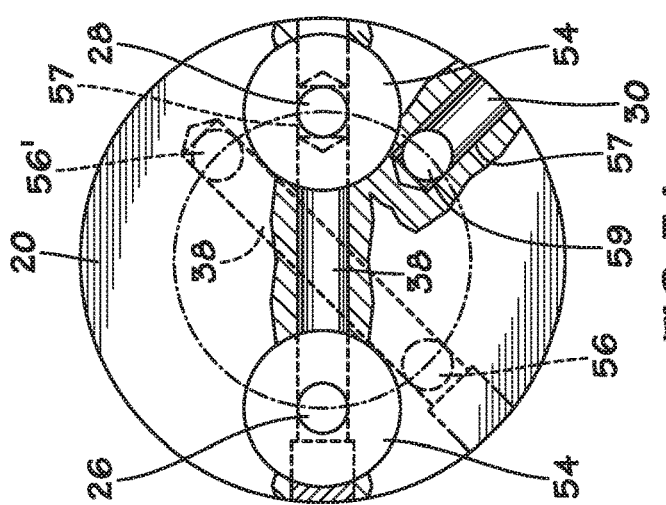
FIG. 3C is a bottom plan view, partially in cross-sectional phantom, of the rotor of the sliding metal seal valve illustrated in FIGS. 1A and 1B with the metal seals shown superimposed with the rotor in phantom turned clockwise from the position shown in FIG. 3B.

As shown by dashed line 58 in FIGS. 3B and 3C, the O.D. of rotor 20 may be significantly reduced when a non-circular (oblate) sliding metal seal 60 is used. Moreover, it has been found that reducing the diameter of rotor 20 significantly reduces the torque required to turn rotor 20 when it is in sliding engagement with non-circular (oblate) metal seals 60. The reduced torque requirement permits smaller motors to be used to actuate valve assembly 10.

As may be seen by comparing sliding metal seal 54 in FIG. 3A with sliding metal seal 60 in FIG. 3B, the radial width of seal 60 is reduced compared with that of seal 54. However, the dimension of seal 60 along the arc traversed by seal-engaging passageways 56 and 56' as rotor 20 is rotated remains the same (or not less than) that of the prior art seal 54 shown in FIG. 3A. This may be done so as to ensure that, as rotor 20 is turned, seal-engaging passageways 56 and 56' are fully engaged on sliding seal 60 before overlapping any part of through bores 62 of sliding metal seals 60 so as to prevent interflow. This feature is illustrated in the phantom view of FIG. 3C.

FIG. 4—an exploded, three-dimensional view of the sliding metal seal of the valve illustrated in FIGS. 1A and 1B—shows through bore 62 for the passage of fluids with circumferential groove 64 for seal 40 and backup ring 42.

As shown in FIGS. 4A and 4B, the body of non-circular (oblate) sliding metal seal 60 has circumferential groove 64 for containing seal 40 and back-up ring 42 (see FIGS. 5 and 6). In the illustrated embodiment, seal 40 is an O-ring seal. In its relaxed state, seal 40 is circular. However, if seal 40 is fabricated of an elastomeric material, it may stretch to fit the oblate shape of peripheral seal groove 64. Alternatively, seal 40 may be molded or otherwise formed to fit the oblate shape of peripheral seal groove 64.

In certain preferred embodiments, back-up ring 42 is fabricated of polytetrafluoroethylene (TEFLON®). In yet other embodiments back-up ring 42 is fabricated of polyetheretherketone (PEEK) or another engineering plastic. Inasmuch as engineering plastics are typically not elastomeric, back-up ring 42 may be skive cut to permit installation into peripheral groove 64 of non-circular sliding metal seal 60.

Figure 5A:
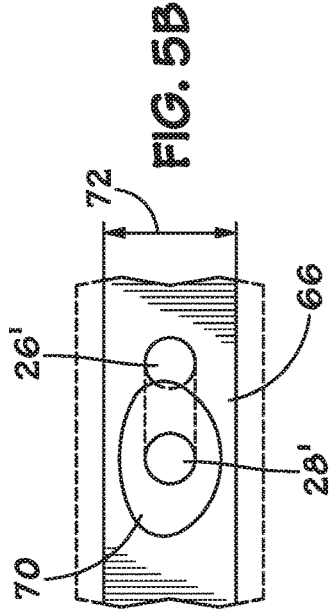
FIG. 5A is a bottom view, partially in cross-sectional phantom, of the bar of a metal bar valve of the prior art.

Non-circular sliding metal seals according to the invention also have application in axially sliding valves. FIG. 5A is a bottom view, partially in cross-sectional phantom, of the bar of a metal bar valve of the prior art equipped with a conventional circular sliding metal seal 68.

Figure 5B:
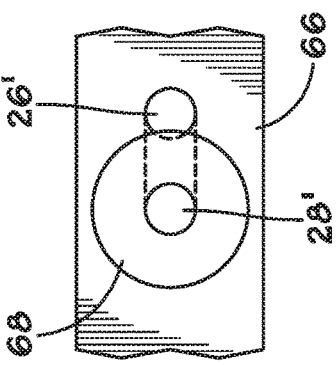
FIG. 5B is a bottom view, partially in cross-sectional phantom, of the bar of a metal bar valve according to an embodiment of the invention.

FIG. 5B is a bottom view, partially in cross-sectional phantom, of the bar of a metal bar valve equipped with a non-circular (lobe) sliding metal seal 70 according to an embodiment of the invention. In certain embodiments, non-circular sliding metal seal 70 may be elliptical in cross section. As shown by the dashed lines in FIG. 5B, the width 72 of bar 66 may be significantly reduced when a non-circular (lobe) sliding metal seal 70 is used in place of a conventional circular sliding metal seal 68.

The use of a non-circular sliding metal seal in a sliding metal seal valve provides the following advantages:

Reduced seal face area resulting in reduced friction on the seal face;

Less torque required (in rotary applications) to actuate the valve;

Less force required for valve actuation (in axial applications, e.g., sliding bar valves);

Reduced rotor diameter (in rotary valve applications); and

Reduced width (in axially actuated valve applications).

A rotary sliding metal seal valve according to the invention comprises at least one pair of non-circular sliding metal seals. The non-circular sliding metal seals may have an oblate cross section.

The rotary sliding metal seal valve may further comprise a rotor having a face in sealing engagement with the at least one pair of non-circular sliding metal seals, a pair of openings in the face of the rotor, and an internal passageway in the rotor interconnecting the pair of openings in the face of the rotor.

The rotor may comprise a substantially cylindrical section having an end forming the face of the rotor and the pair of openings in the face of the rotor may be equally spaced from the wall of the cylindrical section.

The non-circular sliding metal seals may have an oblate cross section that is elongated in an arc traversed by the pair of openings in the face of the rotor when the rotor is rotated. In an embodiment, the oblate cross section is longer in a dimension described by an arc traversed by the pair of openings in the face of the rotor when the rotor is rotated than in a radial dimension relative to the arc.

The rotary sliding metal seal valve may be sized and configured such that the pair of openings in the face of the rotor are circular openings and the oblate cross section of the non-circular sliding metal seals has at least one dimension that is greater than three time the diameter of the circular openings in the face of the rotor.

As illustrated in FIG. 3C, the non-circular sliding metal seals may have a through bore and be sized and configured such that, when the rotor are turned, the pair of openings in the face of the rotor are fully landed on the sliding metal seals before the pair of openings in the face of the rotor overlap any portion of the through bores in the metal seals.

The foregoing presents particular embodiments of a system embodying the principles of the invention. Those skilled in the art will be able to devise alternatives and variations which, even if not explicitly disclosed herein, embody those principles and are thus within the scope of the invention. Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. A rotary sliding metal seal valve comprising:
   a first face of the valve having a plane and defining at least one pair of first openings;
   at least one pair of non-circular sliding metal seals disposed in the at least one pair of first openings in the first face of the valve, each of the sliding metal seals having a non-circular, oblate cross section relative to the plane of the first face, the oblate cross section having a major dimension being longer than a minor dimension; and
   a rotor having a second face in sealing engagement with the at least one pair of non-circular sliding metal seals, the second face of the rotor having a pair of second openings therein,
   wherein the major dimension of the oblate cross section is elongated in an arc about a center of the plane traversed by the pair of second openings in the second face of the rotor when the rotor is rotated.

2. The rotary sliding metal seal valve recited in claim 1 wherein the rotor further comprises an internal passageway in the rotor interconnecting the pair of second openings in the second face of the rotor.

3. The rotary sliding metal seal valve recited in claim 1 wherein the rotor comprises a substantially cylindrical section having an end forming the second face of the rotor; and wherein the pair of second openings in the second face of the rotor are equally spaced from the wall of the cylindrical section.

4. The rotary sliding metal seal valve recited in claim 3 further comprising:
   a third opening in the second face of the rotor; and
   an internal passageway in the rotor connecting the third opening in the second face of the rotor to a fourth opening in the wall of the cylindrical section.

5. The rotary sliding metal seal valve recited in claim 4 further comprising:
   an annular space in the valve surrounding the cylindrical section of the rotor, the annular space being in fluid communication with a vent port of the valve.

6. The rotary sliding metal seal valve recited in claim 1 wherein the major dimension of the oblate cross section is elongated in a direction traversed by the pair of second openings in the second face of the rotor when the rotor is rotated.

7. The rotary sliding metal seal valve recited in claim 1 wherein the pair of second openings in the second face of the rotor are circular openings having a diameter; and wherein the major dimension of the oblate cross section of the non-circular sliding metal seals is greater than three times the diameter of the circular openings in the second face of the rotor.

8. The rotary sliding metal seal valve recited in claim 7 wherein the non-circular sliding metal seals have a through bore and are sized and configured such that, when the rotor is turned, the pair of second openings in the second face of the rotor are fully landed on the sliding metal seals before the pair of second openings in the second face of the rotor overlap any portion of the through bores.

9. The rotary sliding metal seal valve recited in claim 1 wherein each of the at least one pair of first openings defines a counterbore with a shoulder, the counterbore having a second non-circular cross section in the plane of the first face to accommodate the first non-circular cross section of one of the non-circular sliding metal seals.

10. The rotary sliding metal seal valve recited in claim 9 wherein each of the at least one pair of the non-circular sliding metal seals comprises:
    a body having a contact surface and a bottom surface and defining a through-bore from the contact surface to the bottom surface, the body defining an exterior groove thereabout;
    a seal member disposed in the exterior groove and configured to seal with the counterbore; and
    a spring member disposed in the counterbore between the shoulder and the bottom surface of the body and biasing the contact surface relative to the first face.

11. The rotary sliding metal seal valve recited in claim 1, comprising a valve body of the valve defining a cylindrical cavity therein, the cylindrical cavity having the first face on a bottom thereof and having a cylindrical sidewall surrounding the first face, the rotor rotatably disposed in the cylindrical cavity, the first face of the valve body defining the at least one pair of first openings in which the at least one pair of the non-circular sliding metal seals are disposed.

12. The rotary sliding metal seal valve recited in claim 11, wherein the valve body defines a vent port in communication with an annular space between the cylindrical wall and the rotor.

13. The rotary sliding metal seal valve recited in claim 11, wherein the cylindrical cavity defines a first radius, wherein the rotor defines a second radius less than the first radius, wherein the minor dimension—for each of the at least one pair of the non-circular sliding metal seals along the second radius—is less than the major dimension—for each of the at least one pair of the non-circular sliding metal seals along the arc—transverse to the second radius.

14. A subsea assembly for use with a control pod, the assembly comprising:
    a valve disposed on the control pod and having a first face with first openings in communication with the control pod;
    a rotor rotatably disposed in the valve and having a second face disposed adjacent the first face, the rotor having second openings disposed at the second face; and
    at least one pair of non-circular sliding metal seals disposed in the first openings of the first face of the valve, each of the sliding metal seals having a first non-circular, oblate cross section relative to a plane of the first face and configured to engage the second face of the rotor, the oblate cross section being elongated in an arc traversed by the second openings in the second face of the rotor when the rotor is rotated.

15. The assembly of claim 14, wherein the valve comprises:
    a base body attached to the control pod and having the first face with the first openings in communication with the control pod; and
    an upper body attached to the base body and enclosing the rotor.

16. The assembly of claim 14, wherein the non-circular sliding metal seals define a through bore and are sized and configured such that, when the rotor is turned, the second openings in the second face of the rotor are fully landed on the sliding metal seals before the second openings in the second face of the rotor overlap any portion of the through bores.

17. The assembly of claim 14, wherein the oblate cross section is longer in a major dimension, along the arc traversed by the pair of second openings in the second face of the rotor when the rotor is rotated, than in a minor, radial dimension.

18. The assembly of claim 14, wherein the oblate cross section has at least one dimension that is greater than three times a diameter of the second openings in the second face of the rotor.

19. The assembly of claim 14, wherein the rotor defines a first internal passageway and a second internal passageway, the first internal passageway communicating the second openings with one another, the second internal passageway having a third opening in the second face of the rotor and having a fourth opening in a cylindrical sidewall of the rotor; and wherein the valve defines a vent port communicating with an annular space surrounding the cylindrical sidewall of the rotor.

20. A rotary sliding metal seal valve comprising:
a first face of the valve having a plane and defining at least one pair of first openings, each of the first openings defining a counterbore with a shoulder, the counterbore having a non-circular cross section in the plane of the first face; and
at least one pair of non-circular sliding metal seals disposed in the counterbores of the at least one pair of first openings in the first face of the valve, each of the sliding metal seals having an oblate cross section relative to the plane of the first face, the oblate cross section being elongated in an arc about a center of the plane, each of the metal seals comprising:
a body having a contact surface and a bottom surface and defining a through-bore from the contact surface to the bottom surface, the body defining an exterior groove thereabout;
a seal member disposed in the exterior groove and configured to seal with the counterbore; and
a spring member disposed in the counterbore between the shoulder and the bottom surface of the body and biasing the contact surface relative to the first face.

21. The rotary sliding metal seal valve recited in claim 20, further comprising a back-up ring disposed with the seal member in the external groove.

* * * * *